(12) United States Patent  (10) Patent No.: US 8,819,548 B2
Mann et al.  (45) Date of Patent: Aug. 26, 2014

(54) MULTIPLE LANGUAGE DEVELOPMENT ENVIRONMENT USING SHARED RESOURCES

(75) Inventors: Joseph Francis Mann, Waukesha, WI (US); Clinton Duane Britt, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 479 days.

(21) Appl. No.: 12/900,241

(22) Filed: Oct. 7, 2010

(65) Prior Publication Data

US 2011/0029103 A1 Feb. 3, 2011

Related U.S. Application Data

(63) Continuation of application No. 11/530,755, filed on Sep. 11, 2006, now abandoned.

(51) Int. Cl.
*G06F 3/00* (2006.01)

(52) U.S. Cl.
USPC .......................................................... 715/703

(58) Field of Classification Search
CPC .................................................... G06F 17/289
USPC ......... 715/234, 236, 239, 744–747, 760, 866, 715/703
See application file for complete search history.

(56) References Cited

U.S. PATENT DOCUMENTS

| | | | |
|---|---|---|---|
| 5,644,775 A | 7/1997 | Thompson et al. | |
| 6,353,448 B1 | 3/2002 | Scarborough et al. | |
| 6,480,867 B1 * | 11/2002 | Kwan | 715/234 |
| 6,496,793 B1 | 12/2002 | Vediz et al. | |
| 6,622,239 B1 * | 9/2003 | Wong et al. | 712/227 |
| 6,919,966 B2 * | 7/2005 | Nguyen et al. | 358/1.13 |
| 2002/0052749 A1 | 5/2002 | Bauer | |
| 2002/0093683 A1 * | 7/2002 | Focazio et al. | 358/1.17 |
| 2002/0111948 A1 * | 8/2002 | Nixon et al. | 707/10 |
| 2002/0120654 A1 * | 8/2002 | Xu | 707/536 |
| 2002/0162090 A1 | 10/2002 | Parnell et al. | |
| 2002/0198971 A1 | 12/2002 | Resnick et al. | |
| 2004/0172601 A1 * | 9/2004 | Rettig et al. | 715/523 |
| 2005/0009538 A1 | 1/2005 | MacKay et al. | |
| 2005/0227768 A1 | 10/2005 | Blackburn et al. | |
| 2005/0240393 A1 | 10/2005 | Glosson | |
| 2007/0016705 A1 | 1/2007 | Ulenas | |
| 2007/0078839 A1 * | 4/2007 | Teodoro et al. | 707/4 |

OTHER PUBLICATIONS

OA dated Jul. 7, 2010 for U.S. Appl. No. 11/530,755, 28 pages.
OA dated Jul. 31, 2009 for U.S. Appl. No. 11/530,755, 20 pages.
OA dated Jan. 22, 2010 for U.S. Appl. No. 11/530,755, 30 pages.
OA dated Dec. 24, 2008 for U.S. Appl. No. 11/530,755, 25 pages.
Extended European Search Report dated Jun. 24, 2013 for European Application No. EP 07 01 7772, 10 pages.

(Continued)

*Primary Examiner* — Enrique Iturralde (74) *Attorney, Agent, or Firm* — Amin, Turocy & Watson, LLP (57) ABSTRACT

An operator interface system with respect to an industrial automation device comprises text/symbol translation strings persisted in a computer-readable medium for utilization with the operator interface system. An interface component relays the translation strings to a client device that includes fonts that enables the client device to graphically render text/symbols abstracted by the translation strings in a desired language. For example, the translation strings can be Unicode strings.

20 Claims, 11 Drawing Sheets

(56) References Cited

OTHER PUBLICATIONS

Rockwell Automation: "RSView Supervisory Edition—User's Guide vol. 1," Rockwell Automation User's Guides, Jul. 1, 2005, pp. 1-284.

Rockwell Automation: "RSView Supervisory 1-28 Edition—User's Guide vol. 2," Rockwell Automation User's Guides. Jul. 1, 2005, pp. 1-348.

* cited by examiner

MULTIPLE LANGUAGE DEVELOPMENT ENVIRONMENT USING SHARED RESOURCES

CROSS-REFERENCE TO RELATED APPLICATIONS

This application is a continuation of U.S. application Ser. No. 11/530,755, filed Sep. 11, 2006, entitled MULTIPLE LANGUAGE DEVELOPMENT ENVIRONMENT USING SHARED RESOURCES, the entirety of which is incorporated herein by reference.

TECHNICAL FIELD

The claimed subject matter relates generally to industrial environments and, more particularly, to display of operator interfaces in desired language(s).

BACKGROUND

Due to enhancements in communications and travel, such as email, mobile phones, and air travel, today's businesses are not as confined by geographic bounds when compared to the recent past. For example, many years ago business could only be undertaken in a town or city within which the business physically resided. Thus, for example, a blacksmith servicing New York could not provide services to Los Angeles. As time passed and shipping became more expedient and reliable, businesses were able to expand the geographic region with respect to which they could provide goods and/or services. Today, email, text messaging, and the like enable data to be communicated nearly instantaneously between individuals for minimal cost (e.g., for the cost of Internet access). Additionally, expedited shipping enables products to be provided between continents in a matter of mere days. Therefore, even small businesses are capable of becoming international operations, providing goods and/or services to people or businesses in several different countries.

These enhancements in communication have also enabled companies to have several branches in various countries. For instance, a company may have a branch in the United States, a branch in Germany, a branch in Mexico, and a branch in Japan. Therefore, a business providing goods and/or services (such as software and software support) to such company must be capable of providing the goods and services in multiple languages. Continuing with the above example, a business that desires to provide software to the aforementioned company must provide such software in English, German, Spanish, and Japanese to ensure that employees of the company can utilize the software.

Conventionally, multiple software packages are developed, such that each software package supports a particular language. With more particularity (and in accordance with the above example), a software package would be created that includes fonts associated with the English language, a software package would be created that includes fonts associated with the German language, and so on. Fonts that support particular languages within a software package can require a significant amount of storage space (e.g., multiple megabytes), thus rendering electronic transmittal of the software inefficient. Moreover, often products are pre-loaded with software prior to sale, and incorrect delivery of the product can result in a recipient thereof not being able to correctly utilize such product.

SUMMARY

The following presents a simplified summary of the disclosed subject matter in order to provide a basic understanding of some aspects described herein. This summary is not an extensive overview, and is not intended to identify key/critical elements or to delineate the scope of the disclosed subject matter. Its sole purpose is to present some concepts in a simplified form as a prelude to the more detailed description that is presented later.

The subject matter described in greater detail herein relates to utilizing resources of a client device to graphically render text and/or symbols in a language desired by a user of an electronic device that is communicatively coupled to the client device. More particularly, the electronic device, which can be an industrial automation device such as a controller, a human-machine interface terminal, a combined controller/human-machine interface (CHMI), etc., can include translation strings, which are abstractions of text/symbols. For instance, the translation strings can be Unicode strings. The electronic device can also include an operator interface system, which can be utilized to generate operator interfaces for developing applications to be run by the electronic device, configuring the electronic device, and/or using functionality associated with the electronic device. In a particular example, the operator interface provided to a user can enable a user to design human-machine interface (HMI) screens.

When the electronic device is communicatively coupled to the client device (a personal computer, for example), the electronic device can relay operator interface data to such client device, including translation strings that abstract text associated with the operator interface. The client device can then employ resources that are included therein to graphically render text and/or symbols in a language that is desirable to a user of the electronic device. Thus, the electronic device is not burdened with retaining fonts and/or other software required to render text/symbols in a certain language. In other words, the electronic device can be globally marketed without being customized for multiple languages.

The electronic device can also be configured to provide particular operator interface data based at least in part upon a role of a user thereof. For instance, when the electronic device is communicatively coupled to the client device (such as by way of a Universal Serial Bus connection), a user can be prompted to provide information that can be utilized to identify the user, such as a username, password, personal identification number, biometric indicia, security questions, and/or the like. Based upon the determined identification, a user's role can be ascertained, and operator interface data (including translation strings) can be selectively provided to the user based at least in part upon the ascertained role. For example, an executive may desirably be provided with a different operator interface than a maintenance employee.

To the accomplishment of the foregoing and related ends, certain illustrative aspects of the disclosed subject matter are described herein in connection with the following description and the annexed drawings. These aspects are indicative, however, of but a few of the various ways in which the principles of the described subject matter can be employed and such subject matter is intended to include all such aspects and their equivalents. Other advantages and novel features will become apparent from the following detailed description of the invention when considered in conjunction with the drawings.

DETAILED DESCRIPTION

The subject invention is now described with reference to the drawings, wherein like reference numerals are used to refer to like elements throughout. In the following description, for purposes of explanation, numerous specific details are set forth in order to provide a thorough understanding of that described herein. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects described herein may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Figure 1:
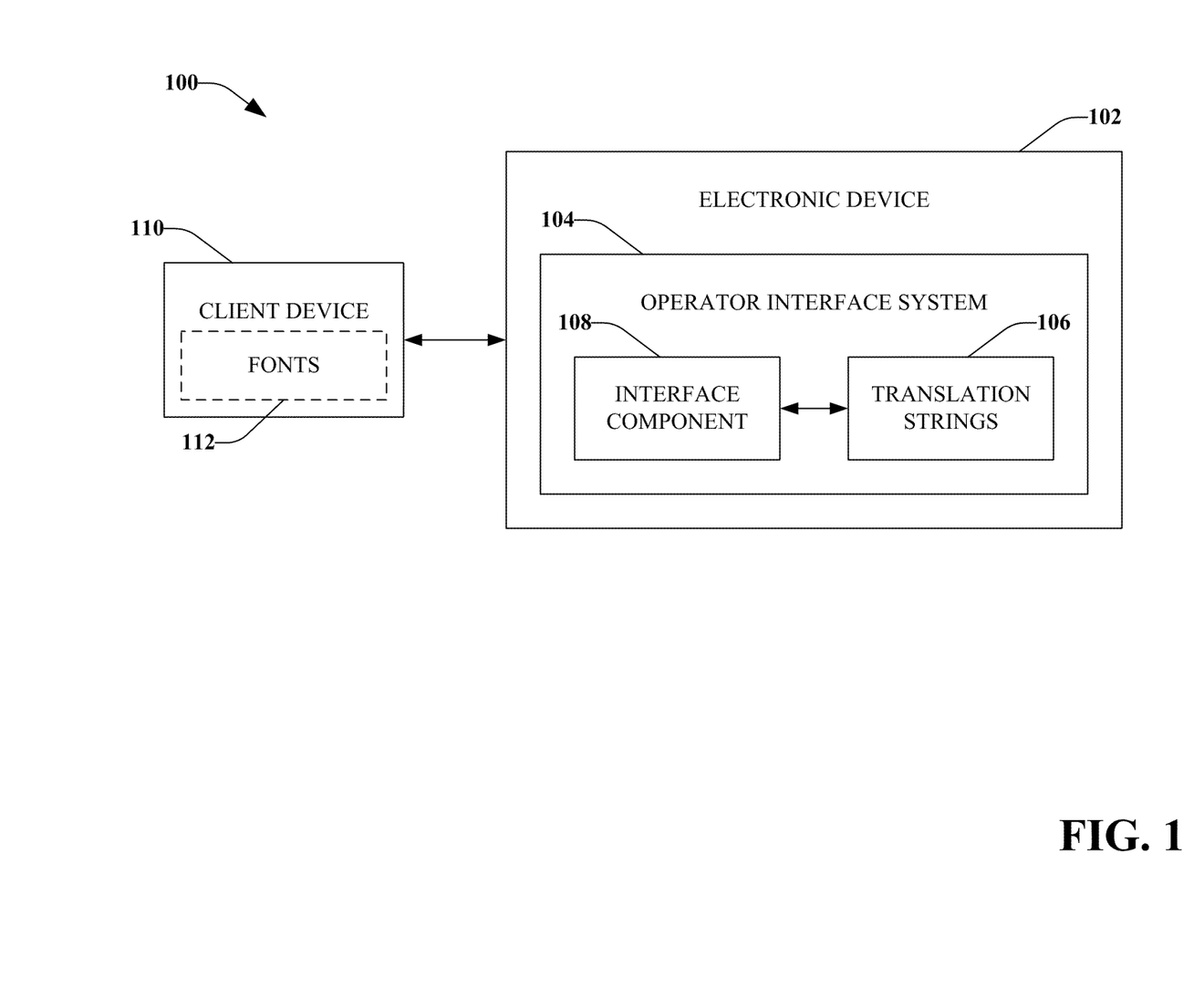
FIG. 1 illustrates a system for providing operator interfaces to a user in a desired language.

Now referring to the drawings, FIG. 1 illustrates a system 100 that facilitates provision of data in a desired language to a user. The system 100 includes an electronic device 102 that comprises an operator interface system 104, wherein the operator interface system 104 is utilized to provide particular data to a user. In an example, the electronic device can be an industrial automation device, such as a controller, a human-machine interface (HMI), and/or a combination controller/HMI (CHMI). The operator interface system 104 can generate operator interfaces that enable an operator to program the electronic device 102, review data that is stored within the electronic device 102, passing through the electronic device 102, create, design, and/or modify human-machine interface (HMI) screens, etc. Pursuant to an example, the operator interface system 104 can be utilized in connection with configuring a control program that is utilized to control an industrial process.

The electronic device 102 may be desirably sold with the operator interface system 104 already embedded therein. Given a desire to service a global market, however, the operator interface system 104 should be configured to display text in certain languages (depending upon a user's location and/or preference). Conventionally, the electronic device 102 must include one or more sets of fonts to enable text to be properly displayed to a user, wherein the fonts can consume several megabytes of storage capacity on the electronic device 102. Storage of fonts thus sacrifices functionality (as storage space that can be utilized to enable additional functionality is consumed by fonts) or increases costs (to increase an amount of storage capacity on the electronic device 102 to enable desired functionality). To make up for the deficiencies, the operator interface system 104 can include translation strings 106, which can be abstractions of text/symbols for all desired language translations. Pursuant to an example, the translation strings 106 can be Unicode strings. It is to be understood, however, that any suitable translation strings are contemplated and are intended to fall under the scope of the hereto-appended claims.

The translation strings 106, for example, can be utilized in connection with displaying text in one of several desired languages, thereby enabling a manufacturer of the electronic device 102 and/or creator of the operator interface system 104 to service a global market without customizing the product for particular countries. The operator interface system 104 can also be associated with an interface component 108 that interfaces the electronic device 102 with a client device 110. In other words, the electronic device 102 acts as a server with respect to the client device 110 when the client device 110 and the electronic device 102 are communicatively coupled by way of the interface component 108. The interface component 108 can provide the client device 110 with appropriate translation strings 106 based upon a sensed location, a user's identity, and/or the like. Alternatively, the interface component 108 can provide the client device 110 with all translation strings 106 resident within the electronic device 102.

In an example, a user may desire to create a program for the electronic device 102, and to do so can couple the electronic device 102 with the client device 110 (e.g., by way of a Universal Serial Bus connection). In accordance with an aspect, the coupling of the client device 110 to the electronic device 102 can provide partial power to the electronic device 102 and enable programming and configuration of such device 102. Once the client device 110 and the electronic device 102 are communicatively coupled (e.g., by a wireless or wirelined connection), the interface component 108 can detect or receive an indication of location of the electronic device 102 or a user of the client device 110 and/or the electronic device 102, and can provide appropriate translation strings 106 to the client device 110. The client device 110 can include fonts 112 that enable the client device 110 to display text within an operator interface in an appropriate language (and at an appropriate size, color, etc.). Thus, the client device's font resources are utilized to free the electronic device 102 from needing to carry many megabytes of font files. For instance, a web browser on the client device 110 can be associated with the fonts 112, and can thus properly render an operator interface to a user (with text in a desired language). The fonts 112 described herein are intended to cover data utilized to determine size of text/symbols, color, language, and other parameters for properly displaying text/symbols.

Figure 2:
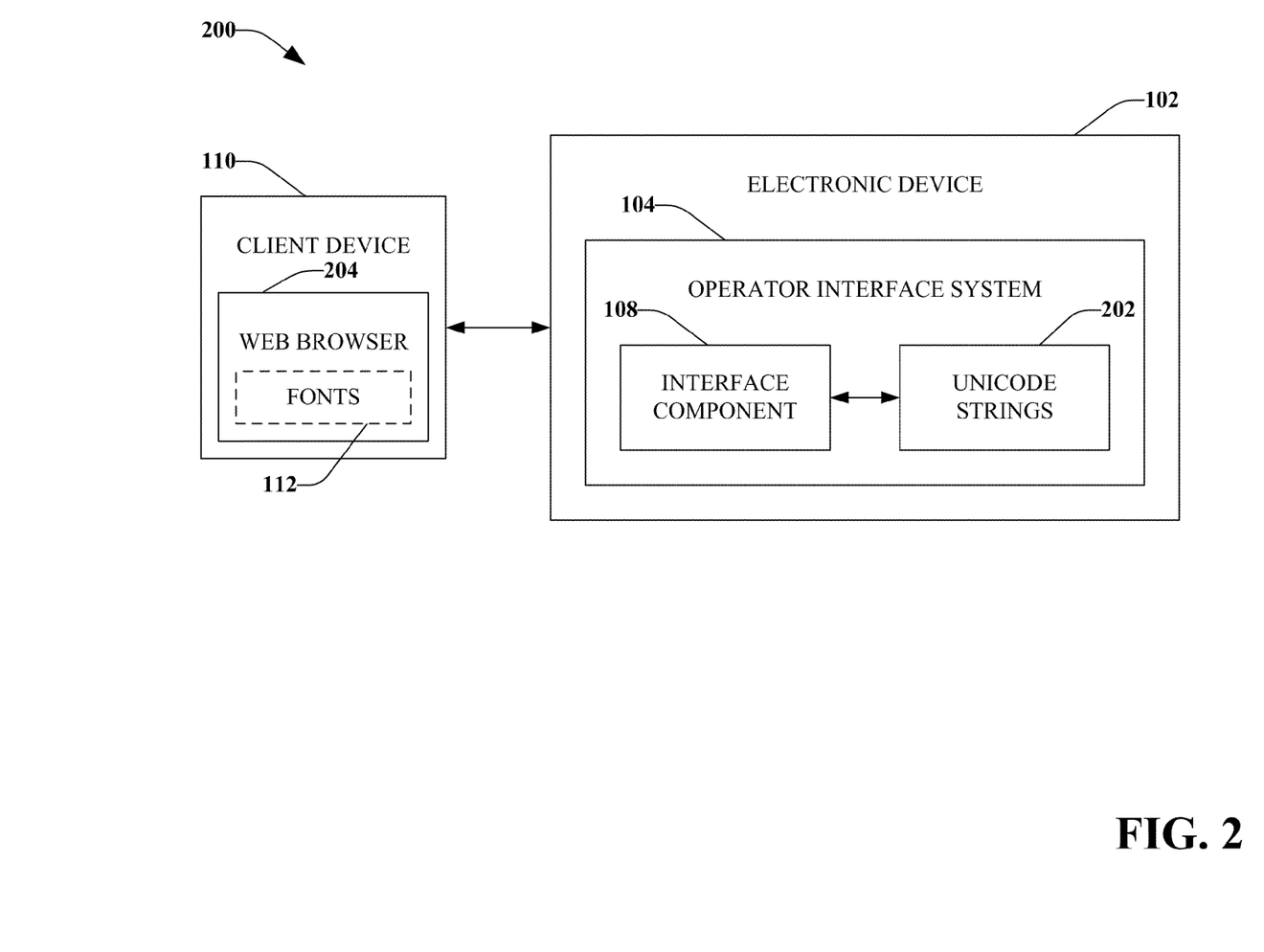
FIG. 2 illustrates a system that facilitates display of an operator interface to a user in an appropriate language through utilization of a web browser on a client device.

Referring now to FIG. 2, a system 200 that facilitates provision of an operator interface to a user in a language that is preferred by the user is illustrated. The system 200 includes the electronic device 102, which is associated with the operator interface system 104. The operator interface system 104 enables a user of the electronic device 102 to create a program for such device, review data thereon, cause the device 102 to operate in a certain manner, etc. Pursuant to an example, the electronic device 102 can be a CHMI device, and a user may desire to configure such device 102 with respect to a particular process. It is to be understood, however, that the electronic device 102 can be any suitable electronic device that is associated with an operator interface system.

The software development system 104 includes the interface component 108, which can relay Unicode strings 202 to the client device 110, which can be a personal computer, a personal digital assistant, or other suitable device. Unicode is an industry standard that is designed to allow text and symbols from various written languages to be consistently represented by computing devices. Unicode consists of a character repertoire, an encoding methodology (and set of standard character encodings), a set of code charts for visual reference, an enumeration of character properties such as upper and lower case, a set of reference data computer files, and rules for normalization, decomposition, collation, and rendering. In text processing, Unicode provides a unique code point (a number, not a glyph) for each character. In other words, Unicode represents a character in an abstract way, and leaves the visual rendering (size, shape, font and/or style) to other software.

The interface component 108 can relay at least a subset of the Unicode strings 202 to the client device 110 upon the client device 110 becoming communicatively coupled to the electronic device 102. The client device 110 can include a web browser 204, which can display text/symbols that are abstracted by the Unicode strings 202. More particularly, the web browser 204 can include the fonts 112 to enable display of text/symbols in a language desired by a user of the client device 110. In another example, the client device 110 can include a word processor or other software that can be utilized to display text/symbols (abstracted by the Unicode strings 202) in an appropriate language. Thus, resources of the client device 110 can be utilized to display text/symbols associated with an operator interface.

Figure 3:
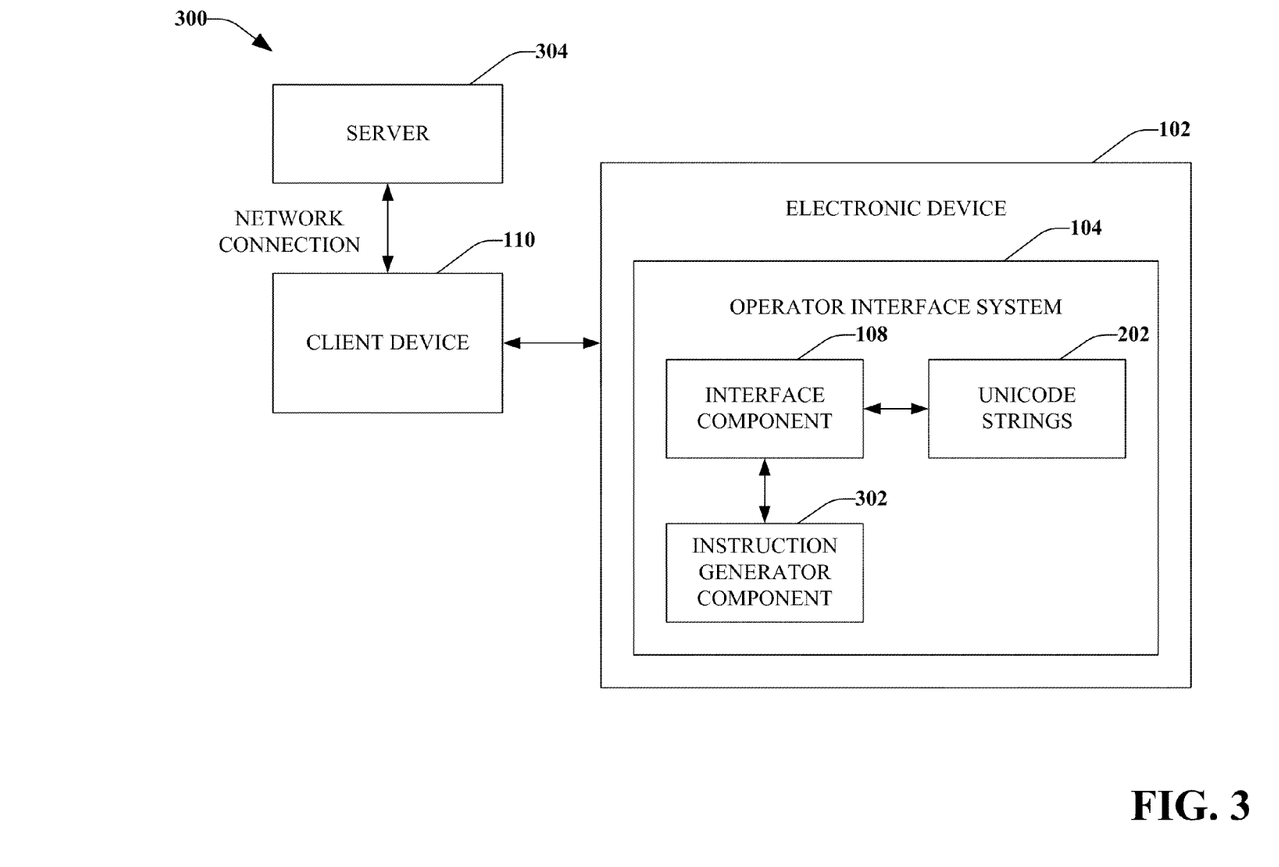
FIG. 3 illustrates a system for locating appropriate resources to enable display of an operator interface in a desired language.

Turning now to FIG. 3, a system 300 that facilitates display of text/symbols associated with an operator interface in a desired language is illustrated. The system 300 includes the electronic device 102, which comprises the operator interface system 104. The operator interface system 104 includes the interface component 108, which provides the Unicode strings 202 to the client device 110 upon the client device 110 and the electronic device 102 becoming communicatively coupled. In another example, the interface component 108 can provide the Unicode strings 202 to the client device 110 upon receipt of a request for the Unicode strings 202, wherein the request can be explicitly provided by a user or implicitly determined through analysis of user actions.

The operator interface system 104 can also include an instruction generator component 302 that provides instructions to the client device 110 regarding displaying an operator interface. For instance, the client 110 may be a specialized piece of equipment that does not include a web browser, a word processor, or other suitable software that oftentimes includes fonts for displaying Unicode strings. The instruction generator component 302 can provide the client device 110 with instructions for obtaining software that enables viewing of Unicode strings in a desirable manner. Pursuant to an example, the instruction generator component 302 can cause the client device 110 to automatically access a server 304 by way of a network connection, such as the Internet. The server 304 can retain a software application and fonts which can be downloaded to the client device 110, wherein a language associated with the fonts can be discerned by determining a location of the client device 110. The instructions created by the instruction generator component 302 can also include instructions that cause the client device 110 to install software/fonts retrieved from the server 304. Thereafter, the client device 110 can display text/symbols within an interface associated with the electronic device 102 in an appropriate language. The server 304 can be maintained by a manufacturer or seller of the electronic device 102, thereby enabling the manufacturer or seller to service a global market without requiring the electronic device 102 to carry fonts associated with displaying text.

Figure 4:
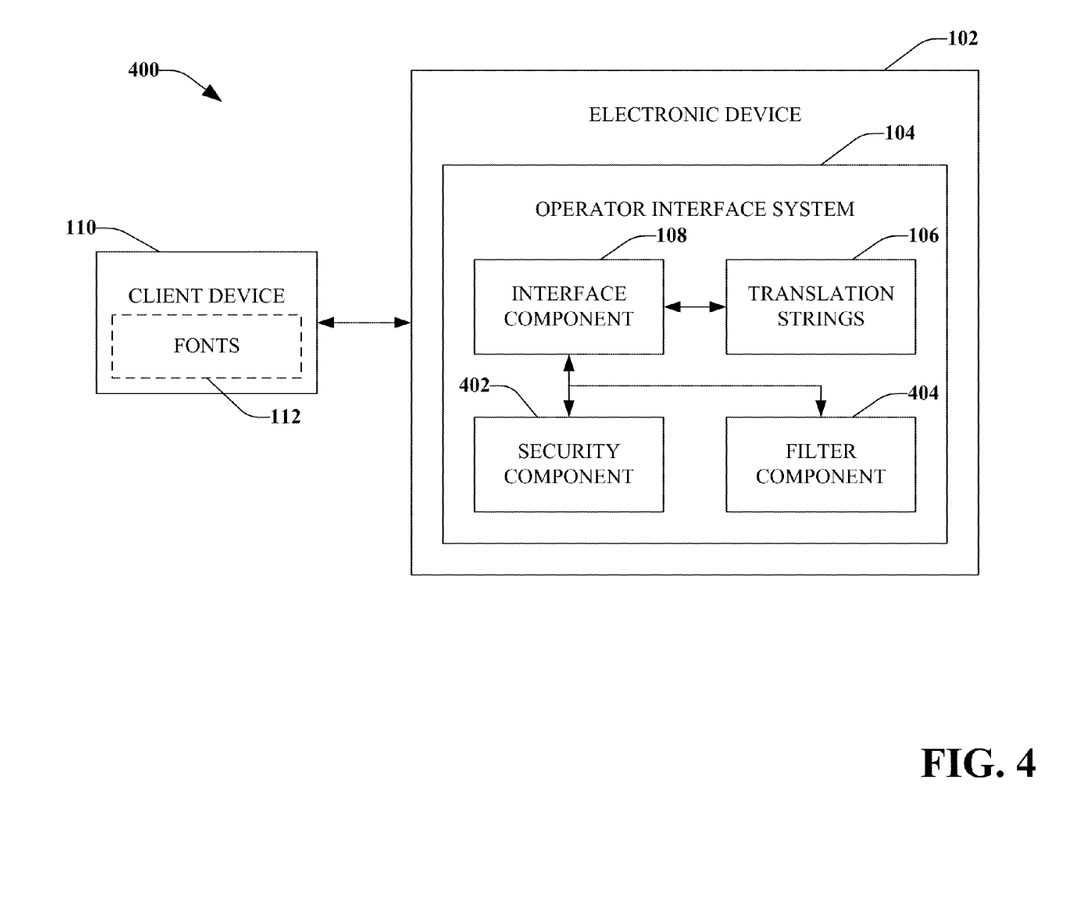
FIG. 4 illustrates a system that facilitates display of an operator interface in a desired language, wherein the operator interface is provided based at least in part upon an ascertained role of a user.

Referring now to FIG. 4, a system 400 that illustrates provision of an operator interface to a user thereof in an appropriate language is shown. The system 400 includes the electronic device 102, which comprises the operator interface system 104. As described above, the operator interface system 104 is utilized in connection with generating an operator interface that can be employed by a user of the electronic device 102 to configure the device 102, utilize particular functionality associated with the device, define security parameters related to the device, and/or the like.

The operator interface system 104 can include a security component 402 that authenticates a user's identity when the electronic device 102 is communicatively coupled to the client device 110. Pursuant to an example, upon the client device 110 being coupled to the electronic device 102, the operator interface system 104 (through use of the security component 402) can provide the client device 110 with prompts for a user name, a password, personal identification number, biometric indicia (such as a voice sample, a fingerprint scan (through a scanning module on the client device 110 or the electronic device 102), security questions (such as a maiden name of the user's mother), or any other suitable information that may be utilized to identify a user. In another example, the security component 402 can receive and analyze a unique identifier associated with the client device 110 in connection with determining an identity of a user. To provide such information, the interface component 108 can provide certain translation strings 106 to the client device 110, which can utilize the fonts 112 thereon to correctly display an operator interface that requests data from the user. Thus, if the electronic device 102 is shipped to a customer in China, when the client device 110 (which includes Chinese fonts) couples to the electronic device 102, the client device 110 will display an operator interface in the Chinese language (and the electronic device 102 does not have to carry the fonts 112).

Once the security component 402 has determined an identity of a user of the electronic device 102, a filter component 404 can be employed to selectively provide data to such user. For example, it may be desirably to provide one operator interface to an executive while providing a different operator interface to a production line manager. The filter component 404 can thus selectively provide data (including certain translation strings) to a user based upon the user's role. Additionally, contextual data can be taken into account by the filter component 404 when selectively providing operator interface data to the client device 110. For instance, it may not be desirably to provide sensitive data to a user whilst the user is in a crowded area (such as a restaurant). Pursuant to an example, the client device 110 may be a personal digital assistant and the electronic device 102 may be portable. A determination can be made regarding location of such devices (e.g., through use of a Global Positioning System resident upon the electronic device 102 and/or the client device 110, triangulation, etc.), and the filter component 404 can cause data to be selectively provided to the client device 110 based upon a user's role and/or location. Other contextual information, such as time of day, day of week, shift associated with an operator using the electronic device 102, whether an alarm is existent, and other suitable information can be employed in connection with selectively providing data (e.g., translation strings 106) to the client device 110 by way of the interface component 108.

Figure 5:
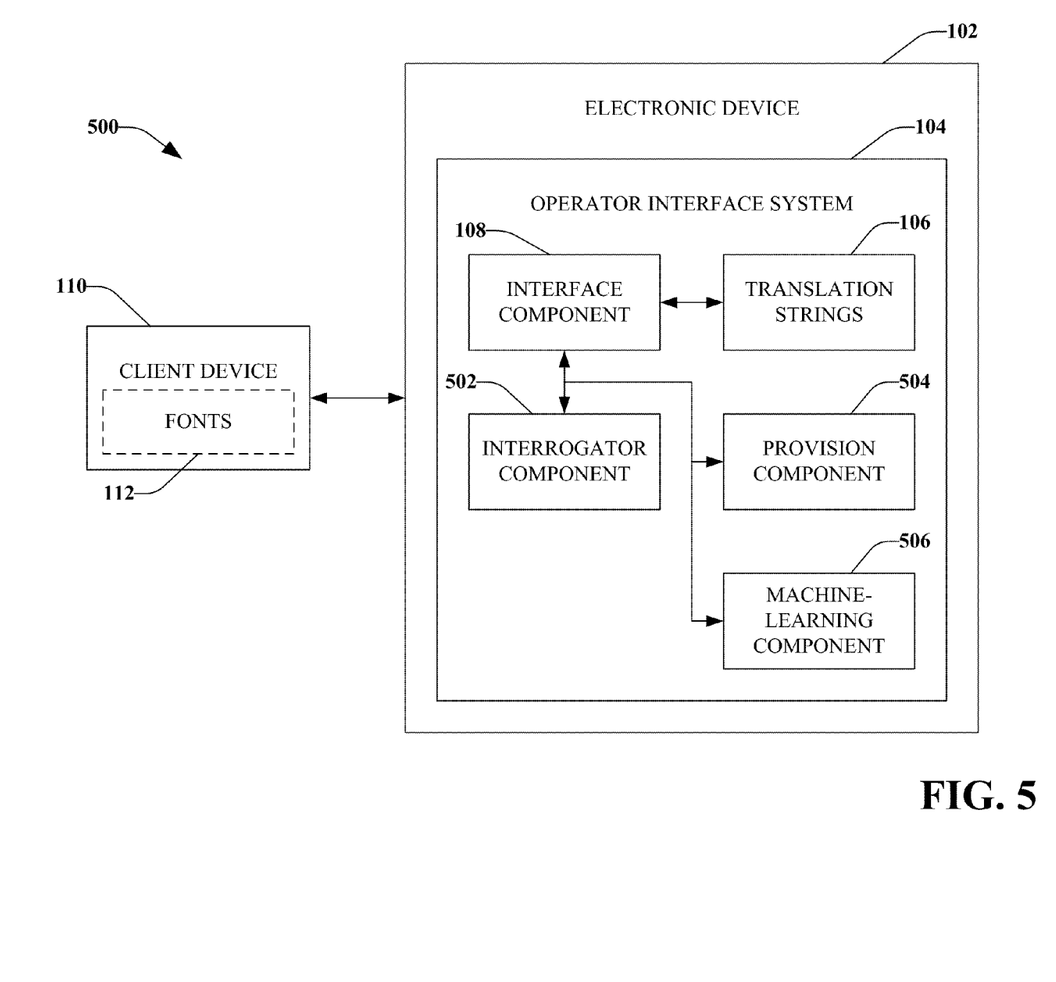
FIG. 5 illustrates a system that facilitates selective provision of operator interface data to a client based at least in part upon ascertained operating parameters associated with the client.

Now turning to FIG. 5, a system 500 for selectively providing an operator interface to a user it illustrated. The system 500 includes the electronic device 102, which can be, for instance, a CHMI device or other suitable industrial automation device. The industrial device 102 is communicatively coupled to the client device 110, which can be a personal computer, personal digital assistant, or other suitable electronic device with display capabilities. Upon detecting a coupling between the electronic device 102 and the client device 110, an interrogator component 502 can interrogate the client device 110 to determine operating parameters/capabilities associated therewith. For instance, the interrogator component 502 can query the client device 110 to determine display capabilities associated therewith, including resolution, display size, color capabilities, and/or the like. Additionally or alternatively, the interrogator component 502 can determine processing and memory capabilities associated with the client device 110 in connection with ascertaining the client device's ability to render graphics. Moreover, the interrogator component 502 can determine what programs are associated with the client device to ensure that such client device 110 has necessary software to properly display an operator interface to a user.

A provision component 504 can then provide the interface component 108 with formatting data and other suitable data, and the interface component 108 can be employed to transfer such data to the client device 110. More particularly, based upon data determined by the interrogator component 502, the provision component 504 can cause a customized operator interface to be displayed at the client device 110. In other words, the provision component 504 can select and format data according to parameters of the client device 110 determined by the interrogator component 502. Thus, a more robust and detailed operator interface can be displayed at the client device 110 if it is a personal computer associated with a significant amount of display real estate as compared to an operator interface displayed if the client device 110 is a mobile telephone (which has a small amount of display real-estate). For instance, different menu options can be provided, different graphics can be provided, and/or the like depending upon parameters determined by the interrogator component 502.

The operator interface system 104 can also include a machine-learning component 506 that can monitor user actions over time and selectively provide particular functionality and/or content to the client device 110 based upon the monitoring. For example, over time it can be discerned that each time a new user utilizes the electronic device 102, such device 102 is reconfigured. Accordingly, if it is determined that an individual is using the electronic device 102 for a first time, the machine-learning component 506 can instruct the provision component 504 to provide the client device 110 with an operator interface that relates to configuration of the electronic device 102. The interface component 108 can also provide appropriate abstractions of text (the translation strings 106) to the client device 110, thereby ensuring that the operator interface is provided to the client device 110 in a desired language.

In other words, the machine-learning component can make inferences regarding operator interfaces to provide to a user of the electronic device 102 based upon user history, user context, previous use of the electronic device 102, and other suitable data. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action. In an example, over time a user may select similar menu options within an operator interface, and the machine-learning component 506 can infer such trend based upon user history. Thus, when the user couples the electronic device 102 to the client device 110, the machine-learning component 506 can instruct the provision component 504 to provide certain menu options more prominently (or automatically order menu options for the user).

Figure 6:
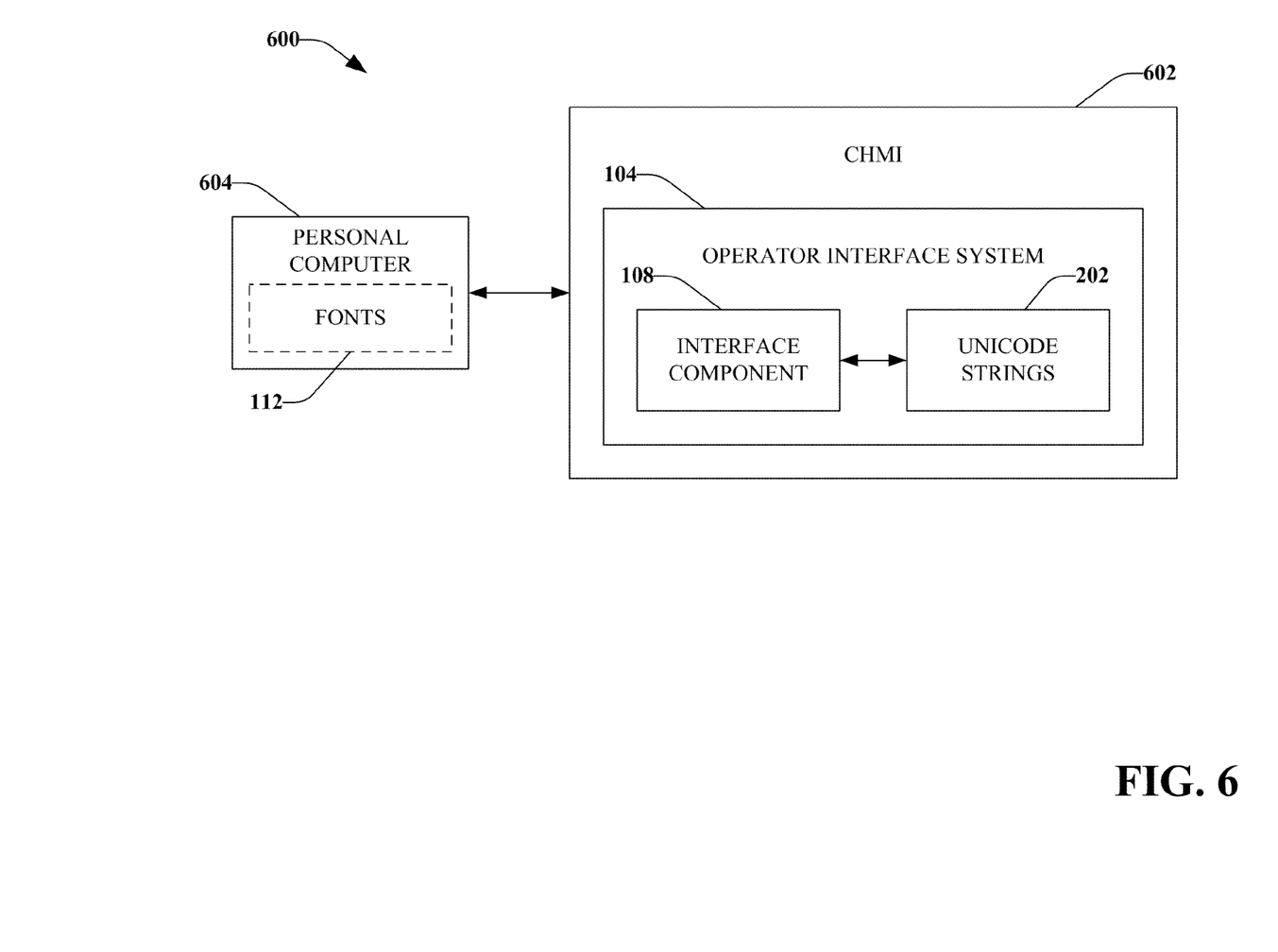
FIG. 6 illustrates an operator interface associated with a combined controller/human-machine interface being provided to a personal computer, wherein text/symbols associated with the operator interface are displayed in a desired language.

With reference to FIG. 6, a system 600 that facilitates provision of operator interfaces in a desired language to a user of an industrial automation device is illustrated. The system 600 includes a CHMI 602, which enables a user to control a particular process. For instance, the CHMI 602 can be portable, and may or may not include display capabilities. Thus, the CHMI 602 can be electronically coupled to manufacturing equipment to control such equipment and/or a process associated therewith. In more detail, the CHMI 602 can include compiled ladder logic and control a process through utilization of such logic.

The CHMI 602 includes the operator interface system 104, which is utilized to provide an operator interface to a client device that is communicatively coupled to the CHMI 602. A user can thereafter receive data from the CHMI 602 and provide data to the CHMI 602 by way of the client device. For example, upon initially coupling the CHMI 602 to a client device, an operator interface can be provided to a user that relates to configuring the CHMI 602. The operator interface system 104 includes the Unicode strings 202, which enables text and/or symbols to be abstracted and not tied to a particular language. Therefore, the CHMI 602 need not retain fonts for graphically rendering text and/or symbols to a user of the CHMI 602.

The system 600 additionally includes a personal computer 604 that acts as a client with respect to the CHMI 602 when the personal computer 604 is communicatively coupled to the CHMI 602. In other words, the CHMI 602 can serve up operator interfaces (and other suitable data) to the personal computer 604, which can in turn utilize a display mechanism associated therewith to present operator interface data associated with the CHMI 602 to a user. The personal computer 604 can also include the fonts 112, which may be associated with a browser or a word-processing product. These fonts 112 can be employed to properly render text/symbols that are abstracted by the Unicode strings within the CHMI device 102 in a desired language. Thus, the CHMI 602 can be marketed globally without being forced to carry certain fonts or a plurality of different fonts, thereby enabling additional storage capacity for functionality. When the CHMI 602 is communicatively coupled to the personal computer 604, the operator interface system 104 can provide the personal computer 604 with an operator interface. The interface component 108 delivers at least a subset of the Unicode strings 202 to the personal computer 604, which utilizes the fonts 112 retained therein to graphically render text and/or symbols in a desired language to the user.

Figure 7:
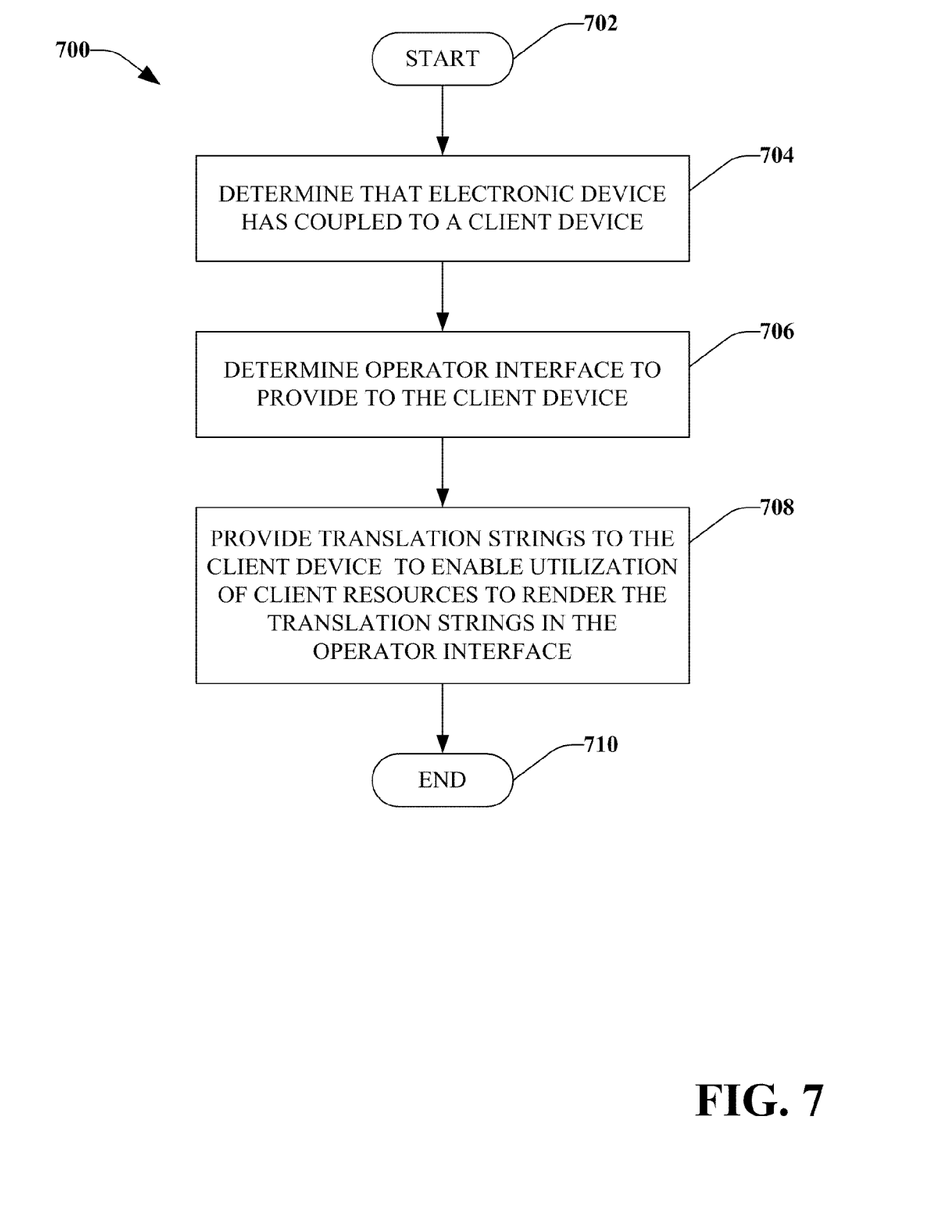
FIG. 7 is a representative flow diagram that illustrates a methodology for displaying operator interface language in a desired language through utilization of translation strings.
Figure 8:
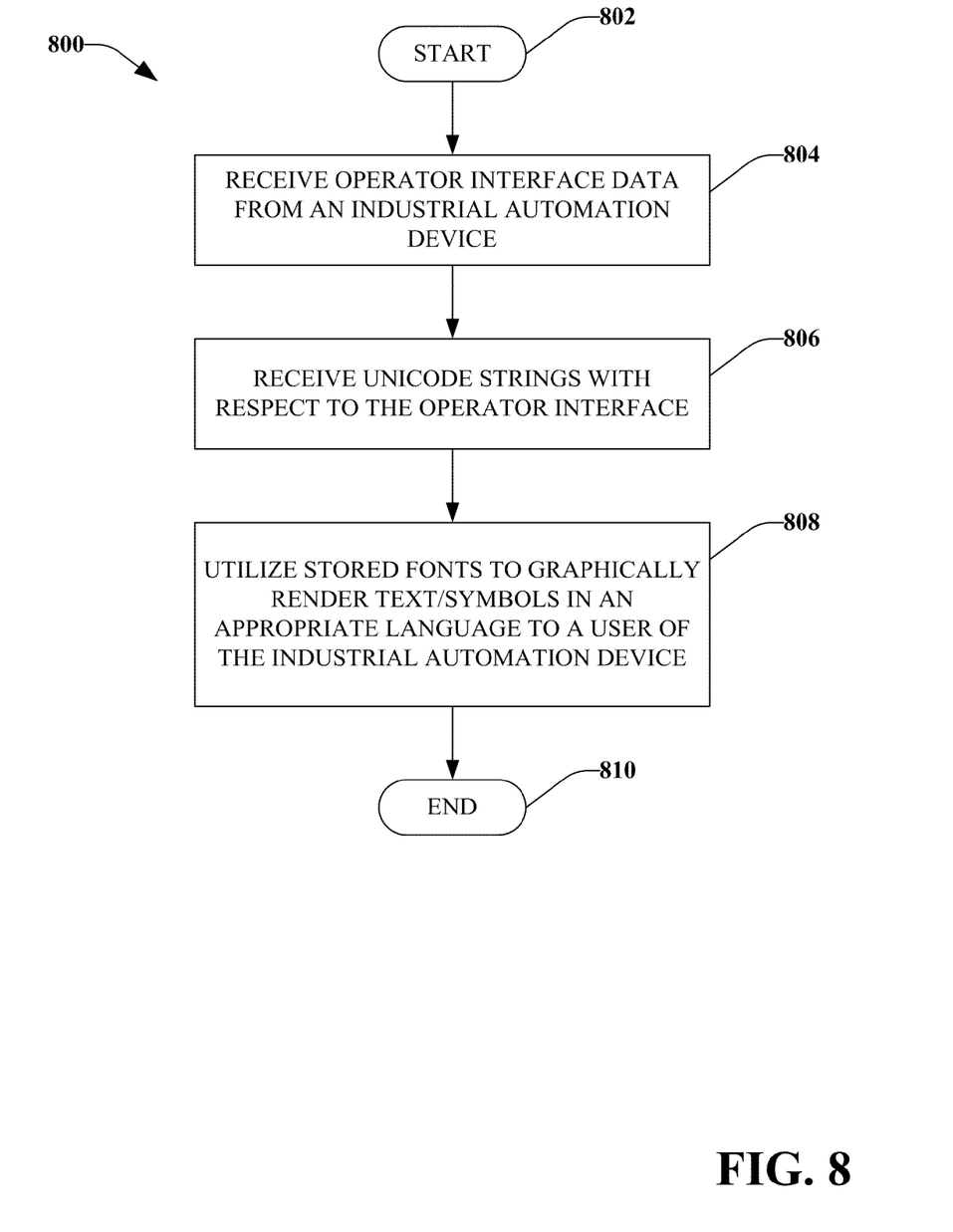
FIG. 8 is a representative flow diagram that illustrates a methodology for utilizing resources on a client device to display Unicode strings in a desired language.
Figure 9:
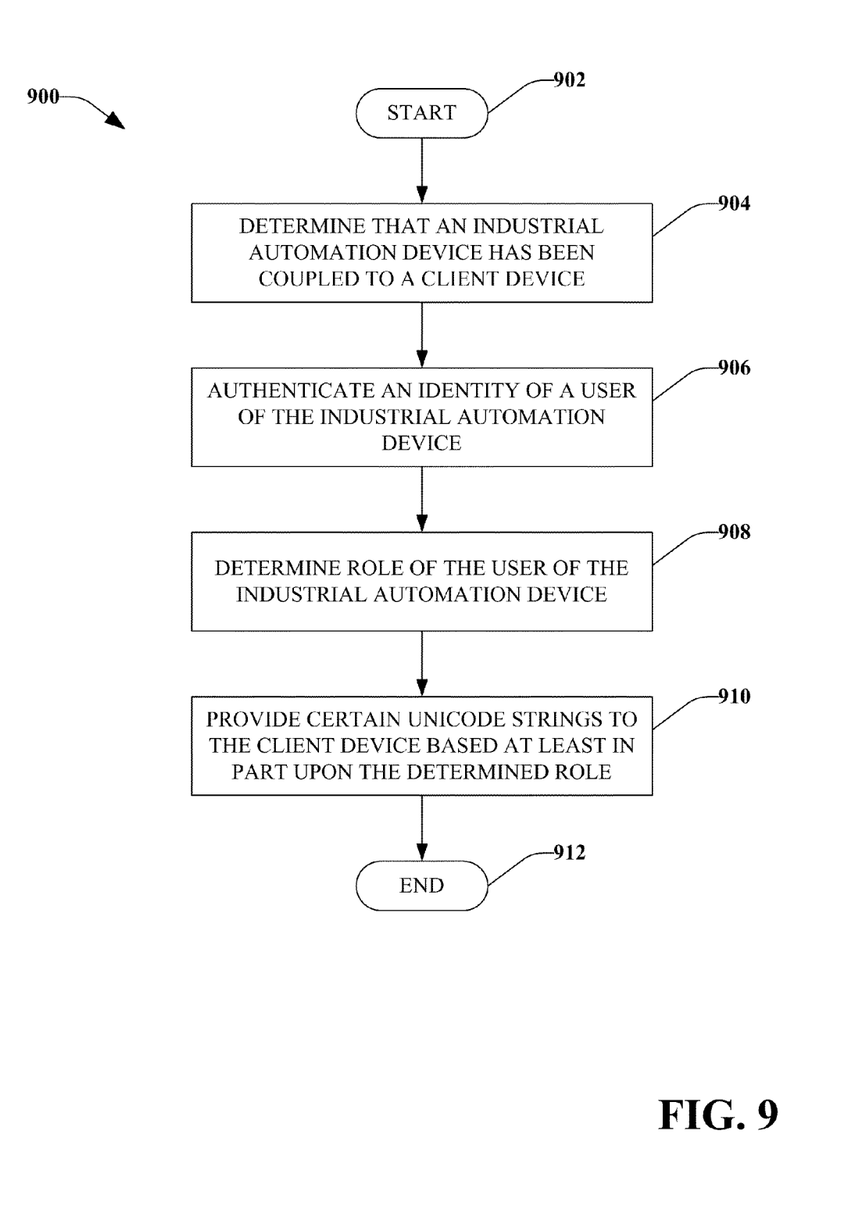
FIG. 9 is a representative flow diagram that illustrates a methodology for selectively providing operator interface data to a user based at least in part upon a role associated with the user.

Turning to FIGS. 7-9, several methodologies are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 7, a methodology 700 for providing translation strings, such as Unicode strings, to a client device is illustrated. The methodology starts at 702, and at 704 a determination is made that an electronic device has been communicatively coupled to a client device. For instance, the electronic device can be an industrial automation device, such as a CHMI device, and the client device can be a personal computer, a personal digital assistant, a mobile telephone, and/or the like. The coupling can be a wireless coupling and/or a wirelined coupling. For example, the electronic device can be coupled to the client device by way of a USB connection or other suitable serial connection. Any suitable coupling is contemplated by the inventors, however, and is intended to fall under the scope of the hereto-appended claims.

At 706, an operator interface to provide to the client is determined. For instance, an operator interface that allows for the configuration of the electronic device by way of the client device can be desirably provided to the client device. At 708, translation strings, such as Unicode strings, are provided to the client device in connection with the operator interface. Provision of the translation strings, which abstract text and/or symbols, enables resources on the client device to be utilized to graphically render text and/or symbols in a desired language. Accordingly, the electronic device need not carry fonts, a web browser, and/or the like for properly displaying text and/or symbols to a user. Rather, resources on the client device can be utilized to undertake the rendering of such text and/or symbols in connection with the operator interface. The methodology 700 then completes at 710.

With reference to FIG. 8, a methodology 800 for utilizing resources upon a client device to present an operator interface for an industrial automation device to a user is illustrated. The methodology 800 starts at 802, and at 804 operator interface data is received from an industrial automation device, which can be a controller, a HMI, a CHMI, and/or the like. The operator interface can be received over a USB connection, for example. At 806, Unicode strings are received at the client device with respect to the operator interface. The Unicode strings are abstractions of symbols and/or text that are resident within the operator interface. At 808, fonts that are retained within a client device are used to graphically render text/symbols in an appropriate language to a user of the industrial automation device. Therefore, rather than requiring the industrial automation device to retain fonts utilized to graphically render text and/or symbols, such fonts can be resident upon the client device. The methodology 800 completes at 810.

Turning now to FIG. 9, a methodology 900 for selectively providing Unicode strings to a client device that is communicatively coupled to an industrial automation device is illustrated. The methodology 900 starts at 902, and at 904 a coupling between an industrial automation device and a client device, such as a personal computer, is detected. The detection can occur at the industrial automation device (which can be a CHMI) and/or the client device. Additionally, the coupling can be a USB connection or any other suitable connection. At 906, an identity of a user of the industrial automation device is authenticated. Pursuant to an example, the industrial automation device can be configured and/or utilized through employment of a graphical user interface associated with the client device (e.g., a screen). The user can be prompted to provide information such as username, password, personal identification information, answers to security questions, biometric indicia, and/or the like by way of the client device to the industrial automation device. Additionally or alternatively, a unique identifier associated with the client device can be provided to the industrial automation device in connection with authenticating a user's identity.

At 908, a role of the user of the industrial automation device is determined, such as whether the user is in management, a line worker, within accounting, within engineering, etc. Contextual information, such as time of day, day of week, states of related industrial devices, and the like can be analyzed together with the client's role to determine an operator interface to provide to the user. For example, an executive would desirably receive a different operator interface than an individual in accounting. Moreover, an individual in engineering might wish to receive different operator interfaces at different times of day. At 910, certain Unicode strings are provided to the client device based at least in part upon the determined role. The client device can include fonts that are utilized to graphically render text/symbols abstracted by the Unicode strings. Thus, certain text/symbols are provided to the user of the industrial automation device. The methodology 900 then completes at 912.

Figure 10:
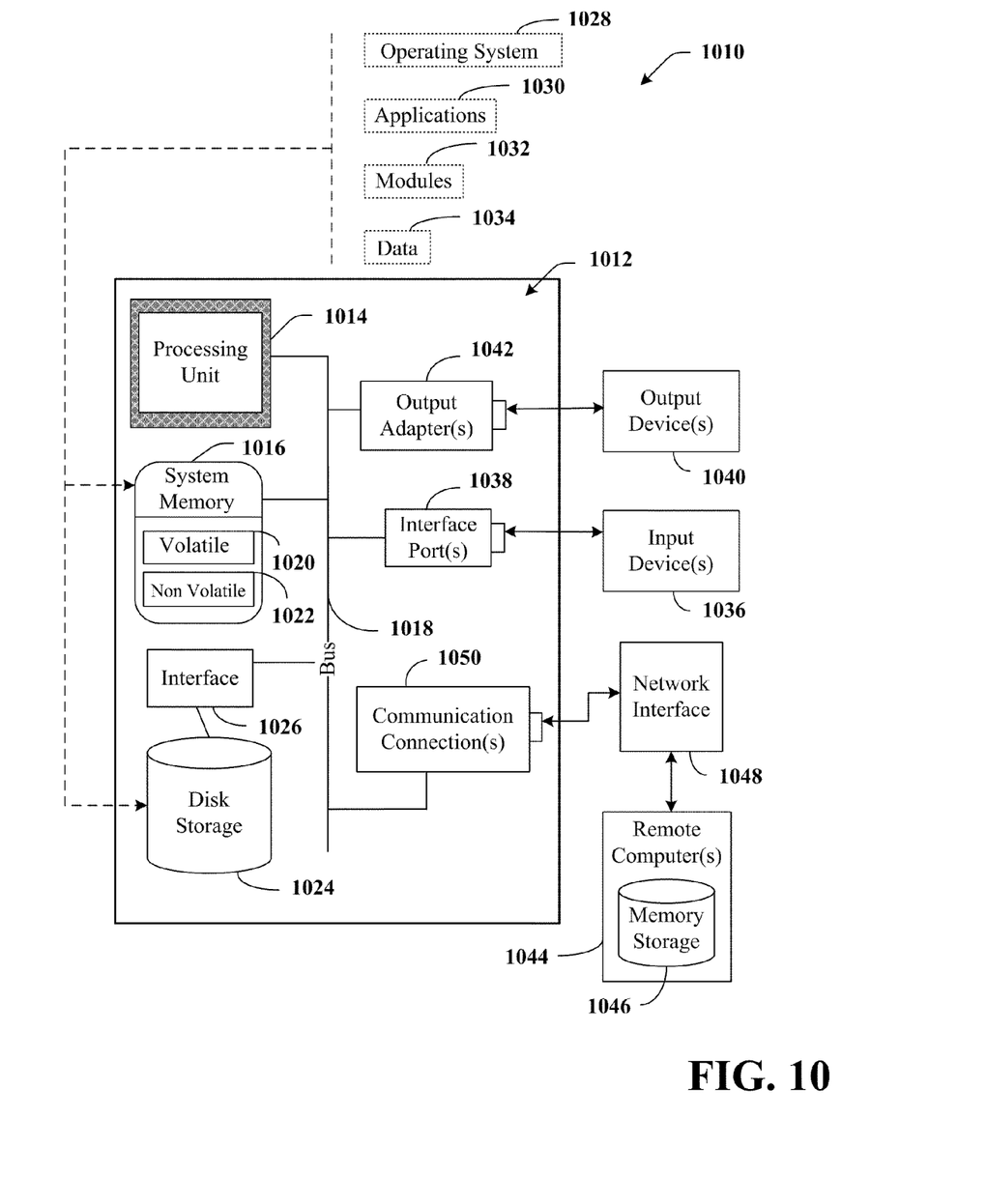
FIG. 10 is an example computing environment.

With reference to FIG. 10, an example environment 1010 for implementing various aspects of the claimed subject matter, including tying data/software to a flash memory card, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
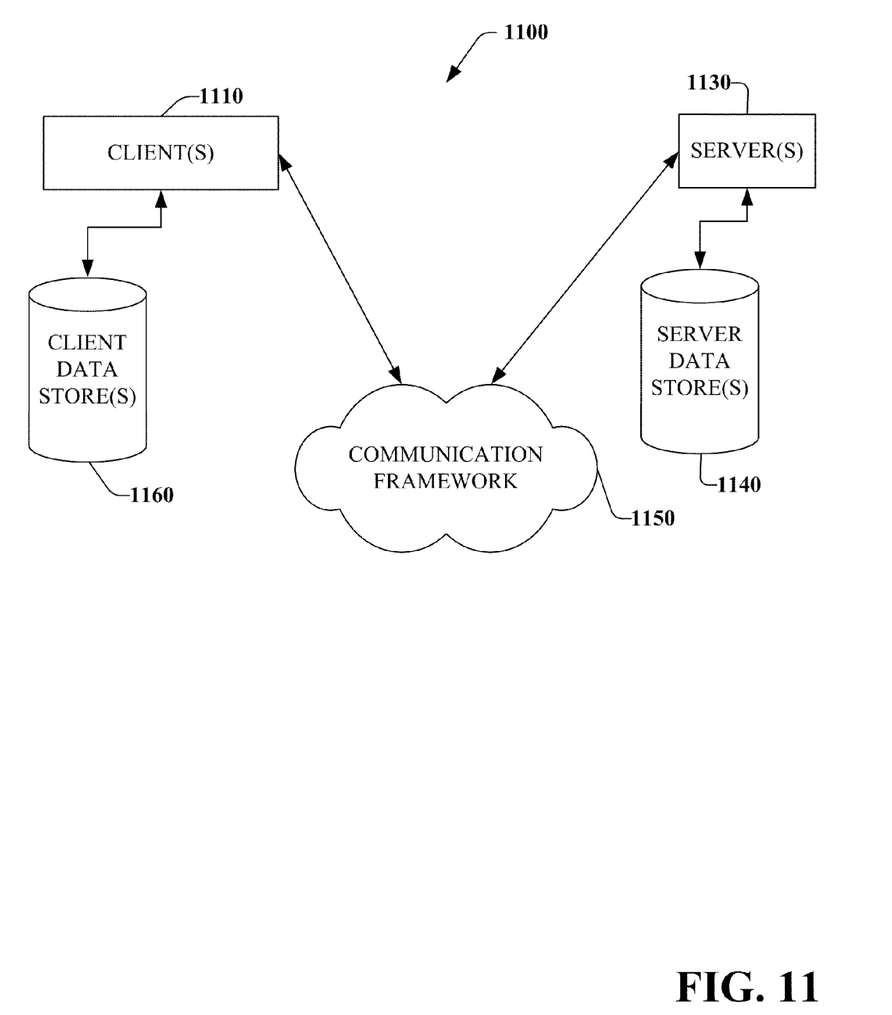
FIG. 11 is an example networking environment.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1130. The server(s)

1130 can also be hardware and/or software (e.g., threads, processes, computing devices). The servers 1130 can house threads to perform transformations by employing the subject invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
   a memory to store computer-executable instructions; and
   a processor that facilitates execution of the computer-executable instructions to at least:
   access a Unicode translation string stored in a memory of an industrial device,
   receive instructions from the industrial device for obtaining software to enable translation of the Unicode translation string;
   obtain and install the software on the device;
   access a font supported by the software to facilitate a translation of the Unicode translation string, and
   utilize the font to facilitate a display of an operator interface based on the Unicode translation string.

2. The device of claim 1, wherein the font is utilized to display text corresponding to the Unicode translation string in a language of a user of the device within the operator interface.

3. The device of claim 1, wherein the processor further facilitates the execution of the instructions to utilize at least one browser program to display the operator interface.

4. The device of claim 1, wherein the Unicode translation string is accessed based on a location of the industrial device.

5. The device of claim 4, wherein the Unicode translation string is related to a language associated with the location.

6. The device of claim 1, wherein the operator interface is a programming interface for the industrial device.

7. The device of claim 1, wherein the industrial device is an industrial controller device or a human machine interface device.

8. A method, comprising:
   accessing, by a device comprising a processing device, a Unicode string stored in a first memory of an industrial device;
   receiving, by the device, instructions from the industrial device for obtaining software to enable translation of the Unicode string;
   obtaining and installing, by the device, the software on the device;
   accessing, by the device, a font supported by the software to facilitate a translation of the Unicode string; and
   displaying, by the device, an operator interface for the industrial device utilizing the font to facilitate the translation of the Unicode string.

9. The method of claim 8, wherein the displaying the operator interface further comprises displaying text within the operator interface according to the Unicode string utilizing the font.

10. The method of claim 8, wherein the displaying the operator interface further comprises employing a browser stored in the second memory of the device to display the operator interface.

11. The method of claim 8, further comprising determining a location of the device.

12. The method of claim 11, wherein the accessing the Unicode string further comprises accessing the Unicode string based on the location.

13. A non-transitory computer-readable medium having instructions stored thereon that, in response to execution by a system comprising a processor, facilitate performance of operations, comprising:
   accessing a Unicode string stored in a memory of an industrial device;
   receiving instructions from the industrial device for obtaining software to enable translation of the Unicode string;
   obtaining and installing the software on the device;
   selecting a font supported by the software to facilitate a translation of the Unicode string; and
   displaying an operator interface for the industrial device utilizing the font to facilitate the translation of the Unicode string.

14. The non-transitory computer-readable medium of claim 13, wherein the operations further comprise displaying text within the operator interface according to the Unicode string utilizing the font.

15. The non-transitory computer-readable medium of claim 13, wherein the operations further comprise initiating a display of the operator interface by a browser.

16. The non-transitory computer-readable medium of claim 13, wherein the operations further comprise determining a language requirement of the operator interface based on a geographical location.

17. The non-transitory computer-readable medium of claim 16, wherein the Unicode string is accessed based on the language requirement.

18. The non-transitory computer-readable medium of claim 16, wherein the font is selected based on the language requirement.

19. The non-transitory computer-readable medium of claim 16, wherein the operator interface is displayed differently for other language requirements different than the language requirement.

20. The non-transitory computer-readable medium of claim 13, wherein the operator interface is a programming interface for the industrial device.

* * * * *